United States Patent [19]

Honda et al.

[11] 4,160,757
[45] Jul. 10, 1979

[54] ADHESIVE COMPOSITION

[75] Inventors: Toshio Honda, Akigawa; Yukio Fukuura, Kodaira; Shoji Tanaka, Higashi-Yamato; Itsuo Tanuma, Tokorozawa; Yoshikatsu Suzuki, Higashi-Murayama; Hikaru Ishikawa, Kokubunji, all of Japan

[73] Assignee: Bridgestone Tire Co., Ltd., Tokyo, Japan

[21] Appl. No.: 772,882

[22] Filed: Feb. 28, 1977

[30] Foreign Application Priority Data

Feb. 28, 1976 [JP] Japan ................... 51-21363

[51] Int. Cl.$^2$ .................. C08K 5/09; C08L 9/00; C08L 27/00; C08L 63/00
[52] U.S. Cl. ................ 260/31.2 N; 260/31.2 MR; 260/31.2 T; 260/32.8 A; 260/32.8 N; 260/32.8 EP; 260/33.2 R; 260/33.2 EP; 260/33.6 A; 260/33.6 EP; 260/33.6 UA; 260/33.8 EP; 260/33.8 UA; 260/42.32; 260/42.47; 260/42.48; 525/109; 525/110; 525/111; 525/113; 525/115; 525/119; 525/122; 525/124; 525/130; 525/146; 525/147; 525/148; 525/150; 525/4; 525/328; 525/329; 525/346; 525/347; 525/374; 525/377

[58] Field of Search ............... 260/887, 836, 859 R, 260/837 R, 31.2, 31.2 N, 31.2 MR, 31.2 T, 32.8 A, 32.8 N, 32.8 EP, 33.6 A, 33.6 EP, 33.6 UA, 33.8 C, 33.8 EP, 33.8 UA, 42.32, 42.47, 42.48, 42.54, 830 S, 32.8, 33.6; 526/15, 16, 33, 34, 49, 52

[56] References Cited

U.S. PATENT DOCUMENTS

| | | | |
|---|---|---|---|
| 3,308,205 | 3/1967 | Bugel | 260/837 R |
| 3,351,571 | 11/1967 | Grace et al. | 260/887 X |
| 3,435,095 | 3/1969 | Bottomley et al. | 260/887 |
| 3,686,362 | 8/1972 | Hinckley et al. | 260/876 R |
| 3,705,868 | 12/1972 | Honda et al. | 260/29.7 R |
| 3,951,898 | 4/1976 | Paul | 260/29.6 NR |
| 4,029,845 | 6/1977 | Nomura | 428/415 |

Primary Examiner—J. Ziegler
Attorney, Agent, or Firm—Sughrue, Rothwell, Mion, Zinn and Macpeak

[57] ABSTRACT

An adhesive composition which shows improved stickiness and adhesive property at room temperature and exhibits an excellent adhering ability in a short time is prepared by compounding (a) an acrylonitrile-containing copolymer having carbon-to-carbon double bond
(b) a phenol-polysulfide resin
(c) a metal oxide, and
(d) a polyfunctional electrophilic reactive compound containing at least two electrophilic reactive groups.

13 Claims, No Drawings

ADHESIVE COMPOSITION

BACKGROUND OF THE INVENTION (1) Field of the Invention

The present invention relates to an adhesive composition and more particularly, the one which can effectively adhere a vulcanized rubber to another vulcanized rubber or to another material.

(2) Description of the Prior Art

It is generally difficult to adhere a vulcanized rubber to another vulcanized rubber or to another materials.

As a method for adhering a vulcanized rubber, it has been proposed that a surface have applied a solution of an unvulcanized rubber in an organic solvent, such as toluene, that is a rubber cement and dried, and then the thus treated vulcanized rubber and an unvulcanized rubber are superimposed, pressed and vulcanized to adhere the unvulcanized rubber, but there is a disadvantage that a mold must be provided for each molding and, further, a complicated mechanical apparatus is necessary for pressing and heating. Furthermore, the unvulcanized rubber to be used is limited to the same kind as the vulcanized rubber.

As another method, it has been proposed that a rubber cement obtained by dissolving unvulcanized polychloroprene (CR), acrylonitrile-butadiene copolymer rubber (NBR), generally referred to as "nitrile rubber", a graft copolymer rubber obtained by grafting a vinyl compound, such as methyl methacrylate, to the above described rubbers or blends of these rubbers with phenolic resins, in an organic solvent, is used for adhering the mutual vulcanized rubbers or a vulcanized rubber to the other material, but this method cannot provide a satisfactory adhesion.

The inventors have already found and proposed the novel method for adhering the mutual vulcanized rubbers or a vulcanized rubber to another material in which the surface of the vulcanized rubber is previously treated with various compounds, such as, iodine isocyanate, active halomethyl ether, sulfur halide, sulfenyl halide, N,N-dihaloalkyl urethane or N,N-dihaloaryl sulfonamide and the thus treated vulcanized rubber is adhered by means of an ordinarily used adhesive. However, this method has the following disadvantage. That is, (a) the specimens to be bonded together are apt to shift before the adhesive is completely hardened or are apt to warp after the adhesion is completed, because of low stickiness or large fluidity of the adhesive to be used in this method, such as a polyurethane elastomer or epoxy resin, and (b) for example, in a polyurethane adhesive, it is necessary to permit it to stand more than one day at room temperature (22° C.) until the highest adhesion is obtained.

SUMMARY OF THE INVENTION

It is an object of the present invention to provide an adhesive composition effective for adhering the mutual vulcanized rubbers or a vulcanized rubber to another material.

It is another object of the present invention to provide an adhesive composition which shows improved stickiness and adhesion under atmospheric pressure and exhibits excellent adhering ability in a short time at room temperature.

The present invention relates to in an adhesive composed of
(a) an acrylonitrile-containing copolymer having carbon-to-carbon double bond
(b) a phenol-polysulfide resin
(c) a metal oxide, and
(d) a polyfunctional electrophilic reactive compound containing at least two electrophilic reactive groups.

The adhesive composition of the present invention is high in the stickiness and adhesion at room temperature and under atmospheric pressure, so that the shifting and the warping do not occur at the bonding faces of the articles to be adhered and further the adhesive composition has no fluidity, whereby the articles to be adhered are tightly bonded with each other.

The adhesive composition according to the present invention can be used at room temperature and under atmospheric pressure and further exhibits a high adhesion in a short time, so that the composition has a broad application in the field where adhesion must be effected in a short time.

The adhesive composition according to the present invention is effective for organic materials, such as synthetic resins, wood, paper, synthetic leathers, natural leather and synthetic fibers and inorganic materials, such as ceramics, earthenware, porcelains, glass, metals, stones, cements, concrete and other materials, as well as vulcanized rubbers.

In particular, the adhesive compositions according to the present invention are effective for endless workings, such as a belt or crawler and the adhesion of industrial goods composed of a reinforcing metal and a rubber, for example the adhesion of a rubber to a metal, such as in a dock fender, hose etc.

DESCRIPTION OF THE PREFERRED EMBODIMENTS

As (a) an acrylonitrile-containing copolymer having a carbon-to-carbon double bond (hereinafter abbreviated as nitrile rubber) to be used in the present invention, mention may be made of acrylonitrile-butadiene copolymer and other examples, such as isoprene-acrylonitrile copolymer, butadiene-styrene-acrylonitrile copolymer, butadiene-acrylic acid-acrylonitrile copolymer, butadiene-methacrylic acid-acrylo-nitrile copolymer, butadiene-alkyl acrylate-acrylonitrile copolymer, and butadiene-alkyl methacrylate-acrylonitrile copolymer.

The copolymers mentioned above are effective as both a random type one and an alternating one.

As (a) component to be used in the present invention, a copolymer having an active hydrogen which is obtained by reacting the copolymer mentioned above with iodine isocyanate and thereafter with a polyfunctional active hydrogen compound having at least two active hydrogens which are reactive against an introduced isocyanate group, is also effective.

The copolymers to be used in the present invention are limited to the acrylonitrile-containing copolymer among the polar rubbers. Polychloroprene rubber (CR), which is one kind of polar rubber similar to a nitrile rubber, cannot attain the object of the present invention. Nonpolar rubbers, such as natural rubber (NR), styrene-butadiene rubber (SBR) and isobutylene-isoprene copolymer (IIR) are also not effective.

The nitrile content of said nitrile rubber (a) is in the range of from 10 to 60%, preferably from 20 to 50%, in view of the adhering ability of the composition and the commercial availability. The molecular weight of said nitrile rubber (a) is not restricted but it is preferably more than 500.

Various fillers and plasticizers may be compounded to said nitrile rubber (a). Suitable compounds may be inorganic fillers, such as carbon black, metal oxides, silica, calcium carbonate, magnesium carbonate, clay, glass beads and organic fillers, such as lignin, vegetable oil, animal oil, mineral oils, such as aromatic, paraffinic and naphthenic oils, synthetic plasticizers, such as phthalic acid ester, phosphorous acid ester, oligomers produced from butene, butadiene, styrene etc., organic fibers, such as nylon, rayon and polyester, inorganic fibers, such as glass fiber and carbon fiber, age resisters, such as an antioxidant, antiozonolysis agent and ultraviolet ray absorbent, and pigments, such as titanium oxide an red iron oxide. These compound may be incorporated in various ratios depending upon the use object of the adhesive composition.

Phenol-polysulfide resins to be used as (b) component in the present invention are compounds represented by the following formula, the preparation of which has been described in U.S. Pat. No. 3,705,868.

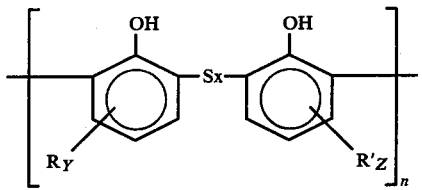

wherein, X is an integer selected from 1 to 5, n is an integer selected from 1 to 20, Y and Z are integers selected from 1 to 4, and R and R' represent radicals selected from the class consisting of —OH, —CH$_3$, —Cl, —Br, —H, —C(CH$_3$)$_3$, —NO$_2$, —OCH$_3$, —COCH$_3$, —COOH and —CHO.

The suitable phenols constituting (b) component described above may be phenol, o-cresol, m-cresol, p-cresol, 2,3-xylenol, 2,4-xylenol, 2,5-xylenol, 2,6-xylenol, p-t-butyl phenol, catechol, resorcinol, pyrogallol and orcinol. Among them, resorcinol is the most preferable. The most preferable phenol-polysulfides to be used as (b) component in the present invention are the disulfides of the phenols described above.

The amount of a phenol-polysulfide to be used in the present invention is in the range of from 0.1 to 50 parts by weight, more preferably from 1 to 20 parts based on 100 parts by weight of the nitrile rubber ((a) component).

When the amount of phenol-polysulfide resin is less than 0.1 part by weight based on 100 parts by weight of the nitrile rubber, the hardening time of the resulting adhesive composition becomes longer and when the amount is more than 50 parts by weight, the physical properties of the adhered layer are deteriorated and it becomes too hard to use practically.

Metal oxides to be used as (c) component in the present invention are the oxides of a metal of Group II, Group III, Group IV and Group VIII in the Periodic Table, for example magnesium oxide, zinc oxide, aluminum oxide, iron oxide, titanium oxide and lead oxide. These compounds may be used alone or in admixture.

Among them, magnesium oxide, zinc oxide, aluminum oxide and titanium oxide are preferable. The amount of a metal oxide to be used in the present invention is in the range of from 0.1 to 50 parts by weight, preferably from 1 to 20 parts by weight, based on 100 parts by weight of the nitrile rubber (a) component. When the amount of a metal oxide is less than 0.1 part by weight based on 100 parts by weight of the nitrile rubber, the hardening time for adhesion becomes rather long, while when the amount is more than 50 parts by weight, the effect does not increase in proportion to the added amount and the cost increases, so that such an amount is not preferable.

The mixing order of the phenol-polysulfide resin and the metal oxide is not particularly limited and they may be added separately or concurrently but in any case, it is necessary to disperse a metal oxide thoroughly into the nitrile rubber.

The rubber composition to be used in preparing an adhesive composition is ordinarily prepared by compounding the nitrile rubber, the phenol-polysulfide, the metal oxide and the other additives, such as fillers and antioxidants by means of a roll, a banbury mixer or a kneader. The resulting rubber composition may be liquid or solid in its appearance according to that of the nitrile rubber to be used as (a) component and can be directly compounded with a polyfunctional electrophilic reactive compound, and in this case a rubber composition which can be quickly hardened is obtained.

However, in the present invention, the rubber composition obtained is ordinarily dissolved in a solvent and the formed solution is applied to the next reaction to form the effective adhesive composition. As the solvent to be used, the solvents having a solubility against the nitrile rubber are conveniently selected.

The suitable solvents are halogenated hydrocarbons, such as chloroform and dichloromethane; aromatic hydrocarbons, such as benzene, toluene and xylene; linear or cyclic ethers, such as diethyl ether, tetrahydrofuran (THF) and dioxane; aliphatic hydrocarbons, such as pentane, hexane and heptane; ketones, such as acetone, methyl ethyl ketone (MEK) and methyl isobutyl ketone, esters, such as methyl acetate and ethyl acetate.

These solvents may be used alone or in admixture of at least two solvents and are not particularly limited, however, acetone, ethyl acetate, tetrahydrofuran, dichloromethane and methyl ethyl ketone are preferable.

An amount of solvent to be used in the present invention is in the range of 0 to 5,000 parts by weight preferably from 300 to 2,000 parts based on 100 parts by weight of a nitrile rubber and the concentration of the solution-formed rubber composition is from 5 to 30 wt.%.

A polyfunctional electrophilic reactive compound containing at least two electrophilic reactive groups to be used as (d) component in the present invention is a compound containing an electrophilic group, such as an isocyanate group, epoxy group, carbonyl halide group and sulfonyl halide group. Among them, a compound containing isocyanate group or epoxy group is preferable, because such a compound does not produce a reaction by-product.

Examples of these polyfunctional electrophilic reactive compounds are aliphatic or aromatic polyisocyanate compounds, such as ethylene diisocyanate, diphenyl methane diisocyanate, hexamethylene diisocyanate, 2,4-tolylene diisocyanate, naphthalene diisocyanate, naphthalene triisocyanate, triphenyl triisocyanate and polyisocyanate compounds obtained by reacting said polyisocyanate with polyols, such as trimethylol propane and glycerine of an amount of less than the stoichiometric equivalent to the isocyanate compound. Furthermore, an isocyanate compound blocked with phenol, acetylacetone, methyl ketoxime, acid sodium sulfite or ethyleneimine which can regenerate the isocyanate by heating may also be used.

The polyepoxy compounds to be used include the polyepoxides having a molecular weight of less than 3,000, preferably less than 1,500, having an epoxy equivalent of less than 800, preferably less than 500 and having at least two epoxy groups per one molecule, for example the reaction products of polyhydric alcohols, such as glycerol, propylene glycol, ethylene glycol, butylene glycol, hexane triol, sorbitol, mannitol, pentaerythrytol, polyvinyl alcohol, tris(2-hydroxyethyl) isocyanate, low molecular weight polybutadiene having terminal hydroxyl group with epoxy compounds having a halogen atom, such as epichlorohydrin; the reaction products of polyhydric phenols, such as resorcinol, hydroquinone, pyrocatechol, 1,3,5-trihydroxy benzene, bis(4-hydroxyphenyl) dimethyl methane, bis(4-hyroxyphenyl) methane, tetra(4-hydroxyphenyl) ethane, trihydroxybisphenyl, 1,5-dihydroxynaphthalene, cashew phenol, dihydroxyphenyl sulfone, 2,2,5,5-tetrakis(4-hydroxyphenyl) hexane, phenolformaldehyde resin and resorcinol-formaldehyde resin with the above described epoxy compounds having a halogen atom, the epoxy compound obtained by oxidizing an unsaturated double bond of the compound with peracetic acid or hydrogen peroxide, such as diglycidyl ether, butyl glycidyl ether, octylene oxide, vinylcyclohexane diepoxide, 3,4-epoxy-6-methylcyclohexylmethyl-3,4-epoxy-6-methylcyclohexene carboxylate, 3,4-epoxycyclohexylmethyl-3,4-epoxycyclohexene carboxylate, 2,6-diglycidyl glycidyl ether, epoxidized low molecular weight polybutadiene, epoxidized low molecular weight styrenebutadiene copolymer and epoxidized low molecular weight nitrile rubber.

Furthermore, triglycidyl cyanurate, triglycidyl isocyanurate, N,N'-bis(2,3-epoxypropyl)piperadine, diglycidyl ferrocene, p-aminophenol glycidylether glycidyl ester, diglycidyl stearylamine, 1,3,5-tris-3-(2,3-epoxypropoxy)propionyl perhydro-s-triazine, diphenolic acid glycidylester ether and tris-(2,3-epoxypropoxy) ethyl cyanurate may be applicable as the epoxy compounds.

Amount of the polyfunctional electrophilic reactive compound to be used as (d) component is not particularly limited, but the use in the range of from 10 to 50 parts by weight based on 100 parts by weight of liquid, solid or solution-formed rubber composition (rubber content), gives good results. When the amount of the polyfunctional eletrophilic reactive compound is less than 10 parts by weight, the hardening time of the resulting composition becomes longer and such an amount is not preferable for adhesion. When the amount of said (d) component is more than 50 parts, the resulting composition become too hard and also in this case, the hardening time becomes longer and it is not preferable for adhesion.

When the resulting adhesive composition is used for adhesion of the vulcanized rubber articles, the improvement of adhesion strength is obtained by pre-treating the surface of the vulcanized rubber article.

As a pre-treating agent, mention may be made of halogen molecules, aqueous solution of halogen molecules, an halogen generators, a pseudo halogen compound (halogenoid) solution etc., for example chlorine, bromine, hypochlorous acid, hypobromous acid, N-monohaloalkyl urethane, N,N-dihaloalkyl urethane, N,N-dihaloarylsufonamide, N-halohydantoin, iodine isocyanate, thiocyanogen, trichloroacetic acid iodide, alkylhypohalide, alkyl thionyl chloride, nitrosyl chloride, sulfur halide, dichloroisocyanuric acid, trichloroisocyanuric acid, etc.

The following examples are given for the purpose of illustration of this invention and are not intended as limitations thereof. In the specification and examples, "parts" means parts by weight.

EXAMPLE 1

One hundred grams of nitrile rubber (acrylonitrilebutadiene copolymer, acrylonitrile content; 49%, Chemigum N-206, produced by Goodyear Tire & Rubber Co.) was masticated at 50° C. and 30 g of carbon black (high abrasion furnace black; HAF) was compounded thereto. Thereafter, 15 g of resorcin-disulfide resin (RDS) and 10 g of zinc oxide were added thereto and the resulting mixture was compounded thoroughly.

The resulting composition was dissolved in 1,000 g of dichloromethane as a solvent to obtain a 14% solution of said rubber composition and to 100 g of the rubber composition solution was added 20 g of a 20% by weight solution of triphenylmethane-4,4',4''-triisocyanate (Desmodur R, produced by Bayer A.G.) in dichloromethane to get an adhesive solution.

The adhesive solution obtained was coated with a brush on the surface of the vulcanized rubber sheet having a thickness of 2 mm, which was produced by embedding reinforcing cords in the compounded rubber having the recipe as shown in Table 1.

After evaporating substantially all of the solvent, the sheet was cut in half and the coated surfaces were affixed together and pressed by means of a hand roller.

A specimen of a length of 10 cm and a width of 2.5 cm was cut off from the laminated rubber sheet obtained as above and the peeling test when the standing time was varied at room temperature (22° C.) was conducted at a speed of a 50 mm/min, in a direction of 180° angle at room temperature and at a higher temperature.

In these cases, the surface of the vulcanized rubber sheets to be examined was previously washed with hexane and thereafter the surface treating agent was coated on the surface with a brush.

For comparison, a similar peeling test was conducted with use of a commercially available urethane elastomer cement and the adhesion strength was examined.

The results obtained are shown in Table 2.

| Recipe of the rubber sheet compounding | |
|---|---|
| Natural rubber (wt.part) | 70 |
| *1 polybutadiene (BR-01) | 30 |
| carbon black | 50 |
| Stearic acid | 1.5 |
| Paraffin wax | 1 |
| N-phenyl-N'-isopropyl-p-phenylene diamine | 1 |
| Zinc oxide | 5 |
| Diphenyl guanidine | 0.5 |
| Dibenzotiazol disulfide | 1 |
| Sulfur | 2 |

Cure condition : 150° C. × 30min
Cure pressure : 30Kg/cm$^2$
*1 BR-01 : Cis polybutadiene produced by Japan Sythetic Rubber Co.

Table 2

| Adhesives Surface treating agent [*2] | Example 1 Adhesive composition of this Example | | | Comparative Example 1 Adhesive consisting of urethane elastomer [*2] | |
|---|---|---|---|---|---|
| | 1 | 2 | 3 | 1 | 2 |
| Adhesive strength (kg/25mm) at 22° C. | | | | | |
| standing time 1 (hr) | 15 | 12 | 16 | 1 | 1 |
| standing time 3 (hr) | 26 | 26 | 30 | 3 | 4 |
| standing time 5 (hr) | 33 | 35 | 43 | 5 | 5 |
| standing time 24 (hr) | 32 | 33 | 35 | 26 | 27 |
| Adhesive strength (kg/25mm) at 120° C. | | | | | |
| standing time 24 (hr) | 16 | 18 | 18 | 9 | 8 |

[*1] Surface treating agent
 1. 3.1wt.% iodine isocyanate solution in dioxane
 2. 10wt.% N,N-dichlorourethane solution in acetone
 3. 10wt.% N,N-dichlorotoluene sulfonamide solution in acetone

[*2] Adhesive consisting of urethane elastomer
 ingredient: polytetramethylene glycol having terminal isocyanate group (isocyanate content: 9.4%, molecular weight: 895) Adiprene L-213 produced by E.I Du pon't de Nemours and Co.    10g
 4,4'-methylene bis(2-chloroaniline)    2.5g
 acetone    12.5g

EXAMPLE 2

A similar rubber composition was prepared as in Example 1 except that the amounts of RDS resin and zinc oxide were changed.

The composition obtained was dissolved in dichloromethane to form a 10–15 wt.% of the solution of rubber composition.

The compounding recipes are shown in Table 3.

Table 3

| | The solution of the rubber composition | | | | | |
|---|---|---|---|---|---|---|
| No. | 1 | 2 | 3 | 4 | 5 | 6 |
| Nitrile rubber (Chemigum N-206) | 100 | 100 | 100 | 100 | 100 | 100 |
| Carbon black (HAF) | 30 | 15 | 15 | 15 | 15 | — |
| Zinc oxide | 10 | 5 | 5 | 5 | — | — |
| RDS resin | 15 | 7.5 | 3 | — | — | — |
| Dichloromethane | 1,000 | 1,000 | 1,000 | 1,000 | 1,000 | 1,000 |

The adhesive compositions were obtained respectively by mixing 20 g of Desmodur R to 100 g of said rubber compositions. The surface of a vulcanized rubber sheet having a thickness of 2 mm, which was prepared in Example 1, was washed with hexane, then, the surface treatment was made by means of a brush by applying an acetone solution of N,N'-dichlorotoluene sulfoamide.

Thereafter, the pre-treated surface was coated with said adhesive composition solution by means of a brush. After the solvent was evaporated, said rubber sheet was cut in half and the coated surfaces were affixed together and pressed with a hand-roller. The same peeling test as described in Example 1 was conducted to the laminated specimen to determine the adhesive strength. The results obtained are shown in Table 4.

Table 4

| | Example 2 | | | | Comparative Example 2 | |
|---|---|---|---|---|---|---|
| The solution of the rubber composition (g) | | | | | | |
| No. 1 | 100 | — | — | — | — | — |
| No. 2 | — | 100 | — | — | — | — |
| No. 3 | — | — | 100 | — | — | — |
| No. 4 | — | — | — | 100 | — | — |
| No. 5 | — | — | — | — | 100 | — |
| No. 6 | — | — | — | — | — | 100 |
| Desmodur R (g) | 20 | 20 | 20 | 20 | 20 | 20 |
| Adhesive strength (kg/25mm) | | | | | | |
| Standing time 4 (hr) | 29 | 25 | 26 | 10 | 6 | 5 |
| Standing time 24 (hr) | 30 | 31 | 40 | 25 | 29 | 28 |

EXAMPLE 3

In a 2 l reaction flask, 50 g of nitrile rubber (Chmigum N-206) was dissolved in 500 ml of tetrahydrofuran (THF). On the other hand, in another reaction flask, 5.5 g of iodine was dissolved in 100 ml of tetrahydrofuran and 7 g of silver cyanate was added thereto and the mixture was reacted for 1 hour at room temperature (20° C.) and the reaction product was filtered to prepare a 3% of isocyanate iodide solution.

100 ml of the 3% of iodine isocyanate solution obtained as above was added dropwise to the nitrile rubber solution (1 mol of iodine isocyanate was reacted with nitrile rubber corresponding to molecular weight of 2,500) at room temperature for 30 minutes. Thereafter 18 g of hydrazine hydrate (hydrazine content 80%) dissolved in 20 g of ethanol and 50 g of THF was added to said reaction mixture and the resulting mixture was reacted at room temperature for 30 minutes and then precipitated again in a large quantity of methanol.

The re-precipitated polymer was dissolved in 500 g of dichloromethane to obtain 10 wt.% nitrile rubber cement.

To 100 g of the nitrile rubber cement obtained, 1 g of RDS resin and 0.5 g of zinc oxide were compounded and 20 g of Desmodur R was mixed to get an adhesive composition.

The surface of the vulcanized rubber sheet having a thickness of 2 mm, which was prepared in Example 1, was washed with a hexane, then pre-treated with 10% acetone solution of N,N'-dichlorotoluene sulfonamide by means of a brush and thereafter was coated with said adhesive composition.

The peeling test was conducted by the same procedure as described in Example 1 to determine the adhesive strength of the specimens.

The results are shown in Table 5.

Table 5

|  | Example 3 | Comparative Example 3 |
|---|---|---|
| NBR cement (g) | 100 | 100 |
| RDS resin (g) | 1 | — |
| Zinc oxide (g) | 0.5 | — |
| Desmodur R (g) | 20 | 20 |
| Adhesive strength (kg/25mm) |  |  |
| Standing time 3 (hr) | 18 | 7 |
| Standing time 6 (hr) | 36 | 10 |
| Standing time 24 (hr) | 55 | 60 |

From the results shown in Table 5, it was concluded that the best adhesive strength was attained in the case where the adhesive composition according to the present invention was used.

EXAMPLE 4

Various dichloromethane solutions of the rubber compositions were prepared in a similar manner as described in Example 1 except that the kind of metal oxides was changed, the recipes of which are shown in Table 6.

Table 6

|  | 1 | 2 | 3 | 4 | 5 | 6 | 7 |
|---|---|---|---|---|---|---|---|
| NBR (Chemigum N-206) | 100 | 100 | 100 | 100 | 100 | 100 | 100 |
| Carbon black (HAF) (g) | 15 | 15 | 15 | 15 | 15 | 15 | 15 |
| RDS resin (g) | 7.5 | 7.5 | 7.5 | 7.5 | 7.5 | 7.5 | 7.5 |
| Zinc oxide (g) | 5 |  |  |  |  |  |  |
| Titanium oxide (g) |  | 5 |  |  |  |  |  |
| Magnesium oxide (g) |  |  | 5 |  |  |  |  |
| Aluminum oxide (g) |  |  |  | 5 |  |  |  |
| Iron oxide (g) |  |  |  |  | 5 |  |  |
| Lead oxide (g) |  |  |  |  |  | 5 |  |
| Dichloromethane (g) | 723 | 723 | 723 | 723 | 723 | 723 | 694 |

The adhesive compositions of each recipe were prepared by mixing 20 g of Desmodur R to 100 g of each solution of the rubber composition shown in Table 6.

As an adhesive test specimen, the vulcanized rubber sheet having a thickness of 2 mm was prepared in the similar manner as described in Example 1. The surface of the sheet was washed with a hexane, applied with 10 wt% acetone solution of N,N'-dichlorotoluene sulfonamide and then coated with said adhesive composition by means of a brush. After evaporating substantially all of the solvent, the sheet was cut in half, and the coated surfaces were affixed and pressed with a hand-roller.

The laminated specimens were analyzed with respect to adhesive strength by the peeling test in the same manner as described in Example 1.

The results obtained are shown in Table 7.

Table 7

|  | Example 4 |  |  |  |  |  | Comparative Example 4 |
|---|---|---|---|---|---|---|---|
|  | 1 | 2 | 3 | 4 | 5 | 6 |  |
| The solution of the rubber composition (g) |  |  |  |  |  |  |  |
| No. 1 | 100 |  |  |  |  |  |  |
| No. 2 |  | 100 |  |  |  |  |  |
| No. 3 |  |  | 100 |  |  |  |  |
| No. 4 |  |  |  | 100 |  |  |  |
| No. 5 |  |  |  |  | 100 |  |  |
| No. 6 |  |  |  |  |  | 100 |  |
| No. 7 |  |  |  |  |  |  | 100 |
| Desmodur R (g) | 20 | 20 | 20 | 20 | 20 | 20 | 20 |
| Adhesive strength (kg/25mm) at 25° C. |  |  |  |  |  |  |  |
| Standing time 4 (hr) | 30 | 10 | 25 | 23 | 7 | 8 | 5 |
| Standing time 24 (hr) | 37 | 25 | 40 | 38 | 20 | 21 | 20 |

What is claimed is:
1. An adhesive composition prepared by mixing
    (a) an acrylonitrile-containing copolymer having carbon-to-carbon double bond
    (b) a phenol-polysulfide resin
    (c) a metal oxide, and
    (d) a polyfunctional electrophilic reactive compound containing at least two electrophilic reactive groups and containing at least one radical selected from the class consisting of isocyanate group, epoxy group, carbonyl halide group and sulfonyl halide group.
2. An adhesive composition as claimed in claim 1, in which (a) component is at least one member selected from the class consisting of butadiene-acrylonitrile copolymer, isoprene-acrylonitrile copolymer, butadiene-acrylonitrile copolymer, butadiene-acrylic acid-acrylonitrile copolymer, butadiene-methacrylic acid-acrylonitrile copolymer, butadiene-alkyl acrylate-acrylonitrile copolymer, butadiene-alkyl methacrylate-acrylonitrile copolymer, and a copolymer having active hydrogen which is prepared by reacting these copolymers with a iodine isocyanate and thereafter with polyfunctional compound having active hydrogen.
3. An adhesive composition as claimed in claim 1, in which (a) component is at least one member selected from the class consisting of butadiene-acrylonitrile copolymer and a copolymer having active hydrogen which is prepared by reacting butadiene-acrylonitrile copolymer with iodine isocyanate and thereafter with a polyfunctional compound having active hydrogen.
4. An adhesive composition as claimed in claim 1, in which (b) component is at least one compound represented by the following formula

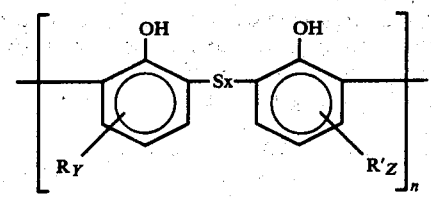

wherein, Y is an integer selected from 1 to 5, n is an integer selected from 1 to 20, Y and Z are integers selected from 1 to 4, and R and R' represent radicals selected from the class consisting of —OH, —CH$_3$, —Cl, —Br, —H, —C(CH$_3$)$_3$, —NO$_2$, —OCH$_3$, —COCH$_3$, —COOH and —CHO.

5. An adhesive composition as claimed in claim 1, in which (b) component is resorcin disulfide.

6. An adhesive composition as claimed in claim 1, in which the amount of (b) component to be used is in the range of from 0.1 to 50 parts by weight based on 100 parts by weight of (a) component.

7. An adhesive composition as claimed in claim 1, in which (c) component is at least one member selected from the class consisting of metal oxides of a metal of Group II, Group III, Group IV and Group VIII in the periodic Table.

8. An adhesive composition as claimed in claim 1, in which (c) component is at least one member selected from the class consisting of magnesium oxide, zinc oxide, aluminum oxide, iron oxide, titanium oxide and lead oxide.

9. An adhesive composition as claimed in claim 1, in which the amount of (c) component to be used is in the range of from 0.1 to 50 parts by weight to 100 parts by weight of (a) component.

10. An adhesive composition as claimed in claim 1, in which (d) component is a polyisocyanate compound.

11. An adhesive composition as claimed in claim 1, in which the amount of (d) component to be used is in the range of from 10 to 50 parts by weight based on 100 parts by weight of (a) component.

12. An adhesive composition as claimed in claim 1, in which the adhesive composition is prepared by compounding (a) component, (b) component and (c) component at first to form a rubber composition by dissolving the composition in a solvent and by reacting the solution with (d) component.

13. an adhesive composition as claimed in claim 12, in which the solvent is at least one selected from the class consisting of halogenated hydrocarbons, aromatic hydrocarbons, ethers, aliphatic hydrocarbons, ketones and esters.

* * * * *